Feb. 9, 1932.  A. L. KNAPP  1,844,168
MOTOR VEHICLE
Filed Sept. 24, 1928

Inventor
ARCHER L. KNAPP.
By
Attorney

Patented Feb. 9, 1932

1,844,168

UNITED STATES PATENT OFFICE

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed September 24, 1928. Serial No. 307,798.

This invention relates to motor vehicles and more particularly to motor vehicle body mountings.

Generally, motor vehicle bodies are mounted upon chassis frames with strips of cork or fiber interposed between the body and the frame and in some instances small blocks of rubber have been employed in lieu of the cork or rubber strips. While these structures have given good results they have not proved entirely satisfactory because such structures do not entirely eliminate vibrations nor sufficiently reduce stresses.

The damping of vibrations manifested from the frame to the body and the elimination of stresses due to shock and the weaving of the frame have become an important problem in motor vehicle structure because such vibrations and stresses are the direct cause of considerable discomfort to passengers and injuriously affect the vehicle.

An object of the invention is to damp vibrations manifested from the chassis frame to the body.

Another object of the invention is to increase the riding comfort in a motor vehicle by the elimination of noise and vibration.

Another object of the invention is to provide means to eliminate noise and vibrations generally transmitted from a chassis frame to the body supported by the frame.

Another object of the invention is to provide a yielding support or cushion interposed between the chassis frame and the body of a vehicle.

Yet another object of the invention is to provide a flexible insulating member interposed between the frame and the body to reduce shock and vibration.

A further object of the invention is to provide a flexible insulating member interposed between the frame and the body to damp vibrations and to eliminate stresses imparted to the body through the frame.

A further object of the invention is to provide a resilient bolster interposed between the frame and the body to insulate sound and shock which would otherwise be transmitted from the frame to the body.

Yet a further object of the invention is to provide a resilient member connected between a chassis frame and a motor vehicle body to effectually insulate the body and to provide means whereby the connecting member is substantially concealed from view.

Still a further object of the invention is to provide a resilient insulating member for securing the body of a motor vehicle to a chassis frame which shall be highly efficient and yet of marked simplicity as a whole and in respect to each of its component parts so that its manufacture may be economically facilitated.

Further objects and advantages of the invention reside in the various combinations hereinafter described and claimed as will be apparent upon reference to the following specification and to the accompanying drawings, in which:

Figure 1:
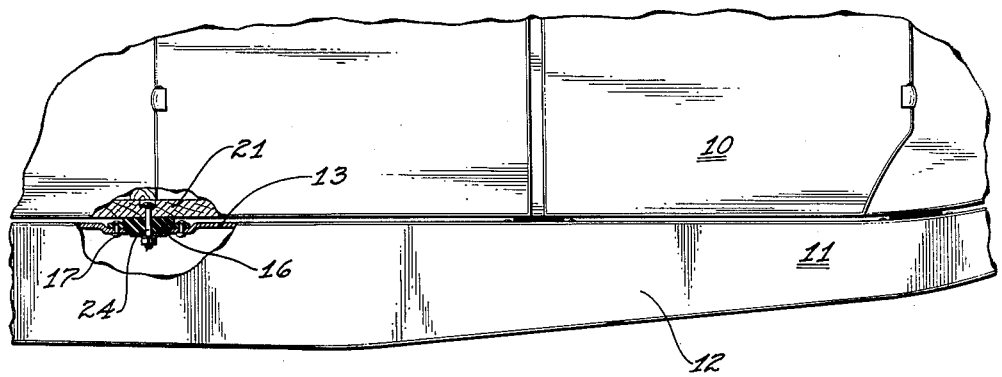
Fig. 1 is a side elevation of a motor vehicle body mounted on a chassis frame, illustrating the invention as applied, parts of the body and frame being broken away.
Figure 2:
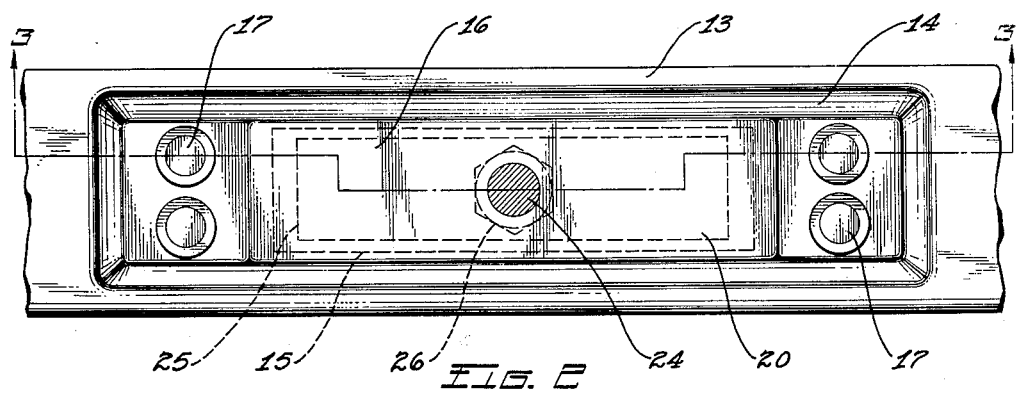
Fig. 2 is a top plan view of a side member of a chassis frame partly broken away, illustrating the invention as applied.
Figure 3:
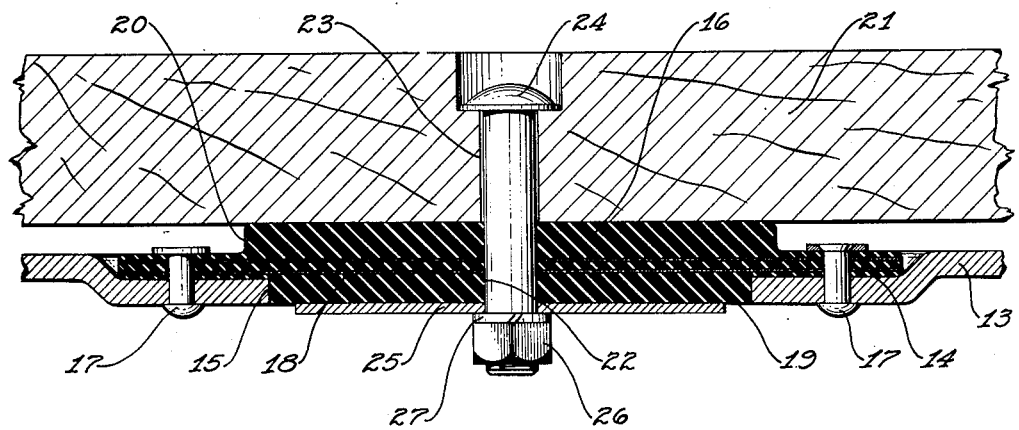
Fig. 3 is a longitudinal sectional view of a body sill and a side member of a chassis frame illustrating the mounting in position.

Referring to the drawings for more specific details of the invention 10 represents a motor vehicle body and 11 a chassis frame supporting the body. As shown, the chassis frame is of the conventional type having the usual side members 12 formed of channel steel with upper and lower corresponding flanges only one of which, the upper flange 13 being shown. The upper flange 13 is provided with a plurality of depressions 14 suitably spaced with respect to each other throughout the length of the side members or at least over such portions of the side members upon which the body rests. As shown, the depressions 14 are elongated and are provided with elongated slots 15 arranged in the bottom thereof. It is, however, to be understood that any other forms of openings may be employed.

Positioned in the depressions 14 are blocks 16, the respective ends of which are secured as by rivets 17 to the flange. These blocks are preferably rubber with strips 18 of strengthening material, such as fiber, imbedded therein so that the flexibility of the block may be confined within certain limits.

The blocks 16 fit snugly in the depressions and are provided with depending portions 19 extending into the slots and raised portions 20 which extend upwardly beyond the plane of the upper face of the flanges 13 so that when receiving the weight of the body the sills 21 thereof are slightly spaced from the side members of the frame to permit flexibility of the blocks without engaging the body and the frame.

The flexible blocks 16 are centrally bored as indicated at 22. These bores register with bores 23 in the sills and with the slots in the depressions. Bolts 24 are positioned in the registering bores and these bolts extend downwardly through and beyond the slots to receive a compression plate 25 which bears against the downwardly extending portion of the blocks, and a nut 26 with a suitable lock washer 27 interposed between the plate and the nut.

The bolts 24 secure the sills of the body to the flexible blocks or members and these members are secured by their respective ends to the flanges on the side members of the frame. Hence the body is completely insulated from the frame and accordingly vibrations manifested from the chassis frame to the body are effectually damped.

The invention herein described has the advantages of increasing the riding comfort of a motor vehicle, this being attained by the elimination of noise and vibration, and in addition thereto the life of the entire vehicle is increased by the elimination of stress and strain caused by shocks and vibrations It is to be understood that the form of the invention herein shown and described is to be taken as a preferred example and that various changes in shape, size and arrangement of parts may be made without departing from the spirit of the invention or scope of the subjoined claims.

Having thus described the various features of my invention, what I claim as new and desire to secure by Letters Patent is:—

1. A motor vehicle comprising a frame having a depression and a slot in the depression, a flexible insulating block positioned in the depression, means for securing the block in the depression, a depending portion on the block engaging in the slot, a raised portion on the block adapted to support a portion of the vehicle in spaced relation to the frame and a bolt passing transversely through the frame and the block.

2. A motor vehicle comprising a frame having a depression and an opening in the depression, a flexible insulating block disposed in the depression and in the opening, means imbedded in the block for restricting the flexiblity thereof, means for securing the block in the depression, a raised portion on the block adapted to directly support a portion of the vehicle in spaced relation to the frame and a bolt passing transversely through and securing the portion of the vehicle against the block.

3. A motor vehicle comprising a frame having a depression and an opening in the depression, a sill, a flexible insulating block positioned in the depression, means securing the block in the depression, a depending portion on the flexible block adapted to fit snugly in the opening, a raised portion upon the flexible block adapted to support the sill in spaced relation to the frame, means imbedded in the block for restricting the flexibility thereof, a plate adapted to bear against the depending portion of the block and a bolt passing through the sill, the flexible block and the plate for securing the sill upon the flexible block.

4. In a motor vehicle, a frame having a depressed portion and an opening in the depressed portion, a block of resilient material disposed in the depression and in the opening and having a portion thereof fastened to the frame, a portion of the vehicle resting on the block, a plate below the block and out of contact with the frame and a bolt through the portion of the vehicle, the block and the plate for securing the portion of the vehicle to the block and the frame.

5. In a motor vehicle, a frame having an elongated depressed portion and having an elongated opening in the depressed portion arranged to provide oppositely disposed ledges therein, a block of resilient material disposed in the depressed portion of the frame, projecting slightly above the frame and secured to the ledges, a vehicle element, and means for fastening the vehicle element to the block.

6. In a motor vehicle, a frame having an elongated depressed portion and having an elongated opening in the depressed portion arranged to provide oppositely disposed ledges therein, a block of resilient material disposed in the depressed portion of the frame projecting slightly above the frame and secured to the ledges, a sill and means for fastening the sill to the frame comprising a plate below the block out of contact with the frame and a bolt through the sill, the block and the plate.

7. In a motor vehicle, a frame having a rectangular depressed portion and having a rectangular opening in the depressed portion of less length than the length of the depressed portion, whereby oppositely disposed ledges are provided in the depressed portion, a block of resilient material in the opening in the depressed portion, extending over the ledges and projecting above the frame, fastening means for fastening the block to the frame at the points where it projects over the ledges, a rectangular plate whose dimensions are less than the corresponding dimensions of the openings, disposed below the block and a bolt passing through the sill, block and plate together for engaging the sill on the frame.

In testimony whereof I affix my signature.

ARCHER L. KNAPP.